United States Patent
Hu et al.

(10) Patent No.: US 12,120,137 B2
(45) Date of Patent: Oct. 15, 2024

(54) GENERATION DEVICE, GENERATION METHOD, AND GENERATION PROGRAM

(71) Applicant: NIPPON TELEGRAPH AND TELEPHONE CORPORATION, Tokyo (JP)

(72) Inventors: Bo Hu, Tokyo (JP); Kazunori Kamiya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 318 days.

(21) Appl. No.: 17/627,065

(22) PCT Filed: Jul. 17, 2019

(86) PCT No.: PCT/JP2019/028178
§ 371 (c)(1),
(2) Date: Jan. 13, 2022

(87) PCT Pub. No.: WO2021/009887
PCT Pub. Date: Jan. 21, 2021

(65) Prior Publication Data
US 2022/0279002 A1    Sep. 1, 2022

(51) Int. Cl.
*H04L 43/022*    (2022.01)
*G06F 21/55*    (2013.01)
*H04L 9/40*    (2022.01)
*G06N 20/00*    (2019.01)

(52) U.S. Cl.
CPC ........ *H04L 63/1425* (2013.01); *G06F 21/552* (2013.01); *H04L 43/022* (2013.01); *G06N 20/00* (2019.01)

(58) Field of Classification Search
CPC ........ G06F 21/50; G06F 21/55; G06F 21/552; G06N 20/00; H04L 43/02; H04L 43/022; H04L 63/14; H04L 63/1408; H04L 63/1425
See application file for complete search history.

(56) References Cited

U.S. PATENT DOCUMENTS

| | | | |
|---|---|---|---|
| 10,187,401 B2 * | 1/2019 | Machlica | H04L 67/02 |
| 2017/0149808 A1 | 5/2017 | Hamada et al. | |
| 2017/0230396 A1 | 8/2017 | Hamada et al. | |
| 2019/0132343 A1 * | 5/2019 | Chen | G06N 3/045 |
| 2019/0196892 A1 * | 6/2019 | Matei | G06N 20/00 |
| 2021/0064018 A1 * | 3/2021 | Hazard | G06N 7/01 |

FOREIGN PATENT DOCUMENTS

| | | |
|---|---|---|
| JP | 2015-149695 A | 2/2017 |
| WO | 2015/194604 A1 | 12/2015 |

OTHER PUBLICATIONS

De Donato et al. (2014) "Traffic Identification Engine: An Open Platform for Traffic Classification", IEEE Network, pp. 56-64.

\* cited by examiner

*Primary Examiner* — D'arcy Winston Straub

(57) ABSTRACT

A generation apparatus includes processing circuitry configured to aggregate a plurality of traffic data for every predetermined target, sample target traffic data in which a number of traffic data aggregated exceeds a threshold, and generate a feature vector representing a feature of aggregated traffic data for a target that is not sampled, and generate a feature vector representing a feature of sampled traffic data for the target sampled.

5 Claims, 8 Drawing Sheets

Fig. 2

| Class | Target i | Bag $r_i$ of network flows (ts, sip, dip, sp, dp, pr, pkt, byt) |
|---|---|---|
| Malicious | Server m1 | 8:00:00, m1, $C_1$, 80, 20000, tcp, 1, 100<br>8:00:00, $C_2$, m1, 30000, 80, udp, 2, 500<br>... |
| | Server m2 | ... |
| | ... | ... |
| Benign | Server b1 | 8:00:00, b1, $C_1$, 80, 20000, tcp, 1, 500<br>8:05:00, $C_1$, b1, 30000, 80, tcp, 1, 50<br>... |
| | Server b2 | ... |
| | ... | ... |

GENERATION DEVICE, GENERATION METHOD, AND GENERATION PROGRAM

CROSS-REFERENCE TO RELATED APPLICATIONS

This application is a U.S. National Stage Application filed under 35 U.S.C. § 371 claiming priority to International Patent Application No. PCT/JP2019/028178, filed on 17 Jul. 2019, the disclosure of which is hereby incorporated herein by reference in its entirety.

TECHNICAL FIELD

The present invention relates to a generation apparatus, a generation method, and a generation program.

BACKGROUND ART

In the related art, there are known techniques for applying supervised learning to a NW flow. At this point, it is known that data sampling reduces an amount of processing.

CITATION LIST

Non Patent Literature

NPL 1: Walter de Donato, Antonio Pescape, and Alberto Dainotti, "Traffic Identification Engine: An Open Platform for Traffic Classification", IEEE Network March/April 2014

SUMMARY OF THE INVENTION

Technical Problem

However, the related art has a problem in that accuracy of a model is reduced. For example, it is considered that a feature amount is generated for each host based on the traffic data obtained from the NW flow. In this case, when the sampling is performed at a predetermined sampling rate, sufficient traffic data cannot be obtained for the host with originally low traffic data, and the accuracy of the model may be reduced.

Means for Solving the Problem

In order to solve the problem and achieve an object, a generation apparatus including: processing circuitry configured to: aggregate a plurality of traffic data for every predetermined target; sample target traffic data in which a number of traffic data aggregated exceeds a threshold; and generate a feature vector representing a feature of aggregated traffic data for a target that is not sampled, and generate a feature vector representing a feature of sampled traffic data for the target sampled.

Effects of the Invention

According to the present invention, the reduction in the accuracy of the model can be restrained.

BRIEF DESCRIPTION OF DRAWINGS

FIG. 2 is a view illustrating an example of traffic data.

DESCRIPTION OF EMBODIMENTS

Embodiments of a generation apparatus, a generation method, and a generation program according to the present application will be described in detail with reference to the drawings. Note that the present disclosure is not limited to the embodiments described below.

Configuration of First Embodiment

Figure 1:
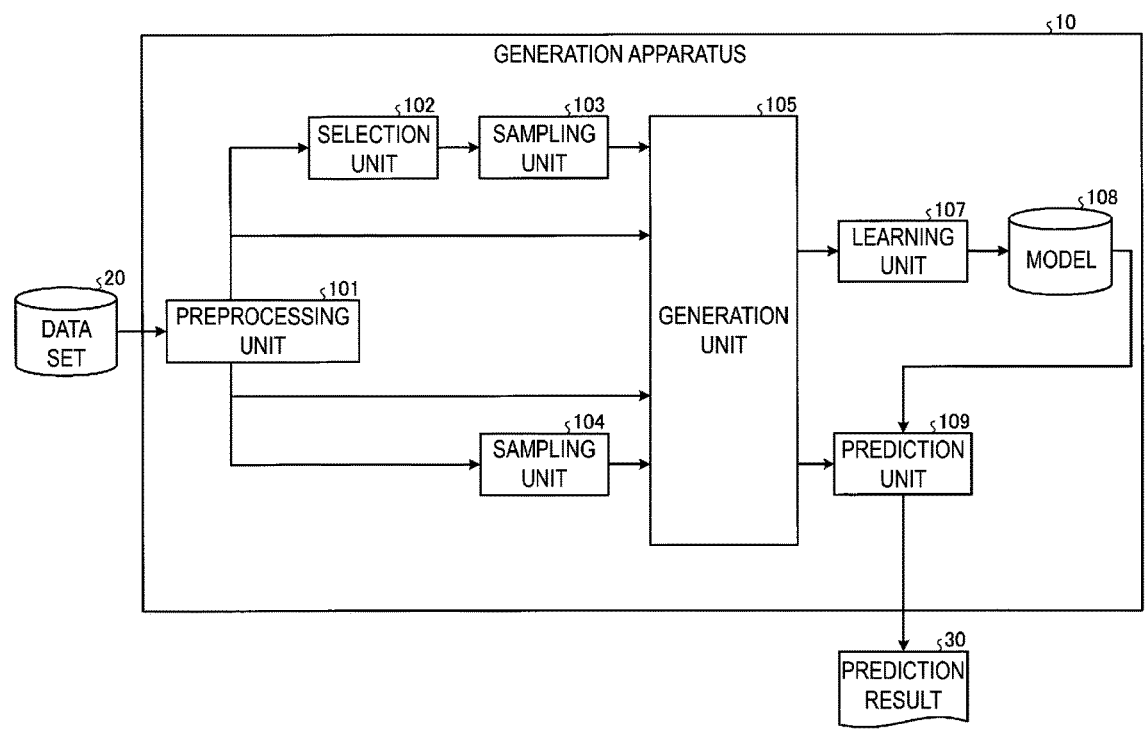
FIG. 1 is a view illustrating a configuration example of a generation apparatus according to a first embodiment.

A configuration of a generation apparatus according to a first embodiment will be described with reference to FIG. 1. FIG. 1 is a view illustrating a configuration example of the generation apparatus of the first embodiment. As illustrated in FIG. 1, a generation apparatus 10 accepts an input of a data set 20, and outputs a prediction result 30.

In embodiments, the description will be given on the assumption that the generation apparatus 10 can generate a feature vector (feature amount) and perform learning and prediction using the generated feature vector. On the other hand, the generation apparatus 10 is capable of generating at least the feature vector. For example, another apparatus may receive the feature vector generated by the generation apparatus 10, and perform learning and prediction using the received feature vector.

The data set 20 is a set of a plurality of traffic data. For example, the traffic data is information obtained from the NW flow. However, the traffic data is not limited to information obtained from the NW flow, and may be any data based on information about the network. In addition, a class may be previously set for the traffic flow. The set class is used as a label during the learning of the model.

FIG. 2 is a view illustrating an example of the traffic data. For example, as illustrated in FIG. 2, the traffic data includes a timestamp per NW flow (ts), a source IP address (sip), a destination IP address (dip), a source port number (sp), a destination port number (dp), a protocol (pr), the number of packets (pkt), and the number of bytes (byt). Sometimes each traffic data is set with any class of malicias or benign.

The traffic data in FIG. 2 is the NW flow (Bag $r_i$ of network flows) aggregated for each target $r_i$. Aggregated processing will be described later. In this case, the target is the source or destination host.

Each unit of the generation apparatus 10 will be described. As illustrated in FIG. 1, the generation apparatus 10 includes a preprocessing unit 101, a selection unit 102, a sampling unit 103, a sampling unit 104, a generation unit 105, a learning unit 107, a model 108, and a prediction unit 109.

The model 108 is a model that predicts whether the traffic is malignant or benign based on the feature vector generated from the traffic data. The generation apparatus 10 can learn the model 108 using the known traffic data of the class.

The preprocessing unit 101 can divide the data set 20 into learning data and prediction data. For example, the preprocessing unit 101 can use, of the traffic data included in the data set 20, the data that the label is applied to the data for learning, and the data that is not provided with the label may be the data for prediction. Whether the learning or the prediction is performed may be predetermined. In this case, the preprocessing unit 101 does not need to separate the data.

The preprocessing unit 101 aggregates the traffic data of the data set 20 in each predetermined target. For example, the target is a host or a flow. For example, when the target is the host, the preprocessing unit 101 aggregates the traffic data common with the source IP address or the destination IP address as the same Bag.

For example, in the example of FIG. 2, the preprocessing unit 101 aggregates the traffic data in which the source IP address or the destination IP address is m1 as Bag $r_{m1}$. The preprocessing unit 101 aggregates the traffic data in which the source IP address or the destination IP address is b1 as Bag $r_{b1}$.

The selection unit 102 selects the target. For example, when the target is the host, the selection unit 102 selects the server in order such as a server m1, a server m2, . . . , a server b1, a server b2, . . . . When the target is the flow, the selection unit 102 selects a combination of values of –five-tuple in sequence.

The sampling unit 103 samples the target traffic data in which the number of traffic data aggregated by the preprocessing unit 101 exceeds a threshold. That is, the sampling unit 103 performs the sampling as long as the target traffic data selected by the selection unit 102 exceeds the threshold. In contrast, when the target traffic data selected by the selection unit 102 is less than or equal to the threshold, the sampling unit 103 does not sample the target. The sampling unit 103 may randomly perform the sampling according to a sampling rate, or may sample a predetermined number of traffic data from a beginning of the traffic data sorted on a predetermined basis.

In this manner, as in this embodiment, the method for selectively determining whether to perform the sampling depending on the number of traffic data is referred to as selective sampling. On the other hand, the method for performing the sampling for all targets is referred to as non-selective sampling.

Figure 3:
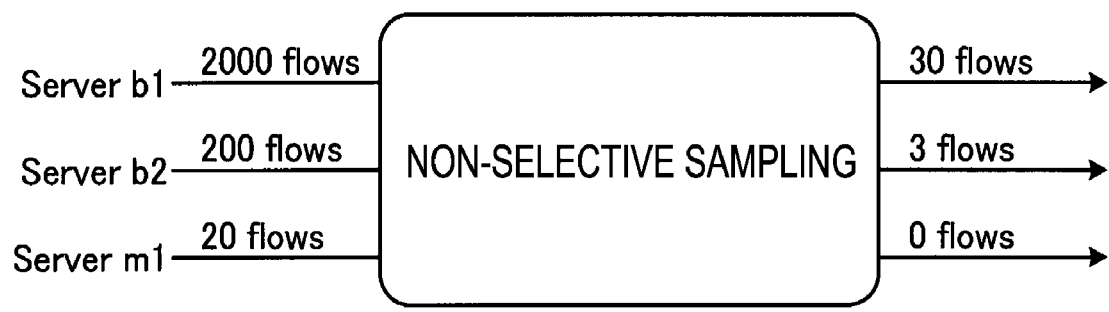
FIG. 3 is a view illustrating non-selective sampling.

The non-selective sampling will be described with reference to FIG. 3. FIG. 3 is a view illustrating the non-selective sampling. As illustrated in FIG. 3, for example, the traffic data of the host "Server b1" is 2,000 cases, the traffic data of the host "Server b2" is 200 cases, and the traffic data of the host "Server m1" is 20 cases.

At this point, it is assumed that random sampling is performed while the sampling rate is set to 1.5%, and that sampling is performed 30 cases from the traffic data of the host "Server b1", 3 cases from the traffic data of the host "Server b2", and 0 case from the traffic data of the host "Server m1".

In this case, the host "Server b1" is considered to obtain the feature amount with sufficient information improving accuracy of the model. On the other hand, for the host "Server b2", it is considered that the accuracy of the model is difficult to improve because the number of data is very small compared with the host "Server b1". Furthermore, for the host "Server m1", the data is missing and the feature amount is not obtained. The non-selective sampling has the problem in that the accuracy of the model may be difficult to improve. Such a problem is solved by the selective sampling.

Figure 4:
FIG. 4 is a view illustrating selective sampling.

FIG. 4 is a view illustrating the selective sampling. In the example of FIG. 4, the threshold is assumed to be 20. It is assumed that the number of traffic data input for each host is the same as in FIG. 3. In this case, it is assumed that the sampling unit 103 samples the same number of traffic data as the threshold. The sampling unit 103 may sample the predetermined number of traffic data that is greater than or equal to the threshold and that is less than the number of traffic data aggregated on the host.

The sampling unit 103 performs sampling of 20 samples from the traffic data of the host "Server b1" because the number of data of the host "Server b1" exceeds the threshold. The sampling unit 103 performs the sampling of 20 samples from the traffic data of the host "Server b2" because the number of data of the host "Server b2" exceeds the threshold. The sampling unit 103 does not perform the sampling from the traffic data of the host "Server m1" because the number of data of the host "Server m1" does not exceed the threshold. This means that all of the traffic data of the host "Server m1" is a subject of the generation of the feature amount.

The generation unit 105 generates the feature vector representing the feature of the aggregated traffic data for the host that is not sampled by the sampling unit 103. The generation unit 105 generates the feature vector representative of feature of the sampled traffic data for the host sampled by the sampling unit 103.

In the example of FIG. 4, the generation unit 105 generates the feature vector from the traffic data sampled by the sampling unit 104 for the hosts "Server b1" and "Server b2". On the other hand, the generation unit 105 generates the feature vector from the traffic data before sampling because sampling is not performed on the host "Server m1."

The sampling unit 103 and the sampling unit 104 are represented by different blocks in FIG. 1 in order to explain learning and prediction separately, but the sampling unit 104 performs the same processing as the sampling unit 103.

The learning unit 107 performs the learning of the model 108 using the feature vector. In this case, as illustrated in FIG. 2, it is assumed that a label expressing malignancy or benign for each host is known. The prediction unit 109 inputs the feature vector of the traffic data in the learned model 108, and predicts a label indicating whether the traffic data is malignant or benign.

Processing in First Embodiment

Figure 5:
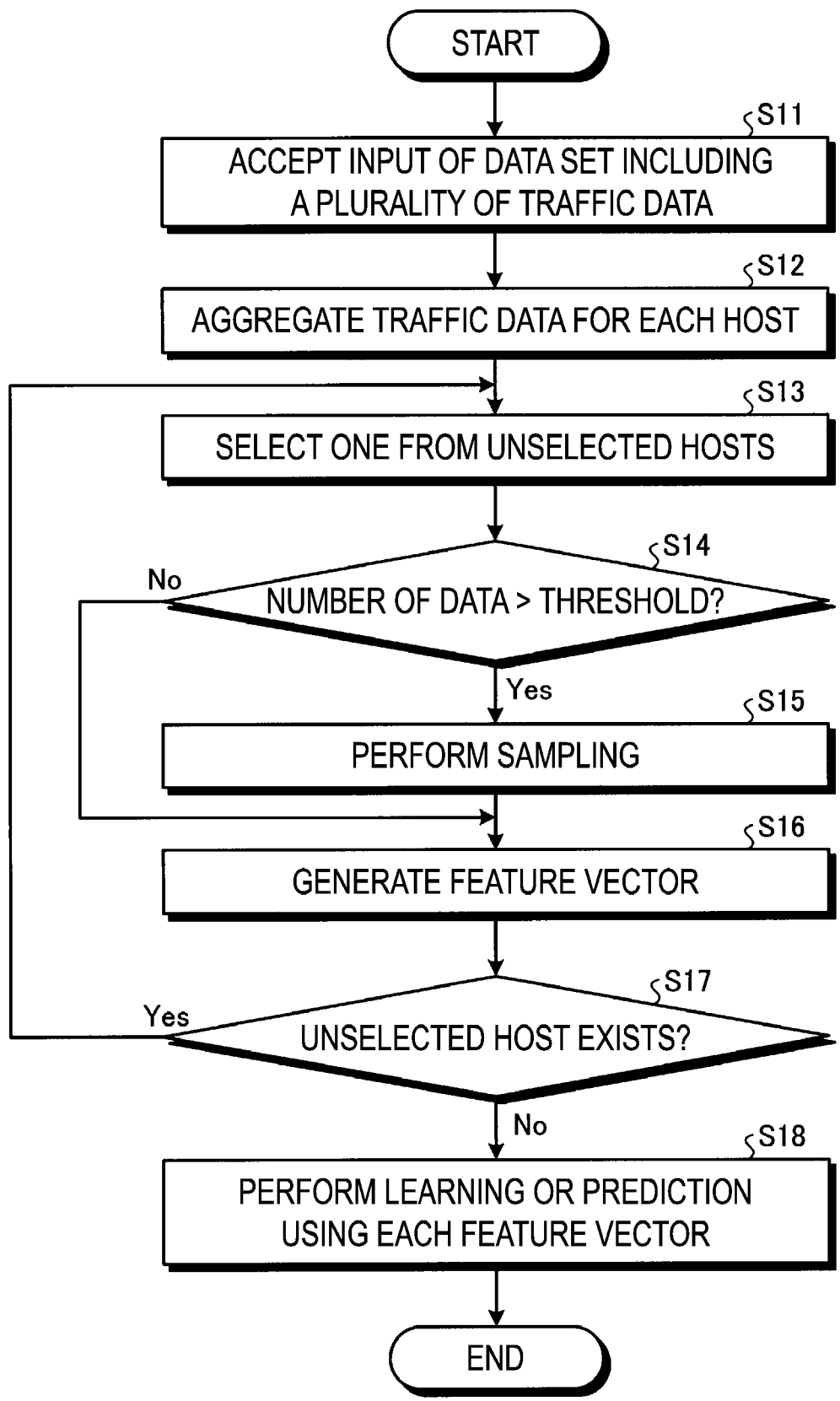
FIG. 5 is a flowchart illustrating processing of the generation apparatus of the first embodiment.

The processing performed by the generation apparatus 10 of the first embodiment will be described with reference to FIG. 5. FIG. 5 is a flowchart illustrating the processing of the generation apparatus according to the first embodiment. As illustrated in FIG. 5, the generation apparatus 10 accepts the input of the data set including the plurality of traffic data (step S11). Then, the generation apparatus 10 aggregates the traffic data for each host (step S12).

At this point, the generation apparatus 10 selects one from the unselected hosts (step S13). The generation apparatus 10 determines whether the number of aggregated traffic data exceeds the threshold for the selected host (step S14).

In accordance with a determination that the number of traffic data exceeds the threshold (Yes in step S14), the generation apparatus 10 samples the traffic data for the host (step S15). On the other hand, in accordance with a determination that the number of traffic data does not exceed the threshold (No in step S14), the generation apparatus 10 does not sample the traffic data for the host.

Then, the generation apparatus 10 generates the feature vector (step S16). At this point, the generation apparatus 10 generates the feature vector from the sampled traffic data for the host that is sampled, and generates the feature vector from the input traffic data before the sampling for the host that is not sampled.

When the unselected host exists (Yes in step S17), the generation apparatus 10 returns to step S13 and repeats the processing. On the other hand, when the unselected host does not exist (No in step S17), the generation apparatus 10 performs the learning or the prediction using each feature vector (step S18).

Effects of First Embodiment

As described above, the generation apparatus 10 aggregates the plurality of traffic data for each predetermined target. The generation apparatus 10 also samples the target traffic data in which the number of aggregated traffic data exceeds the threshold. The generation apparatus 10 generates a feature vector representing a feature of aggregated traffic data for a target in which the sampling is not performed, and generates a feature vector representing a feature of the sampled traffic data for the target in which the sampling is performed. In this manner, the generation apparatus 10 can determine whether to perform the sampling according to the number of traffic data for each target. According to the first embodiment, the data for generating the feature amount can be prevented from becoming extremely small or completely eliminated due to sampling, so that reduction in the accuracy of the model can be suppressed.

The generation apparatus 10 samples a first number of traffic data, wherein the first number is equal to the threshold, or greater than or equal to the threshold and less than the number of traffic data aggregated to the target. In the generation apparatus 10, the sampling unit 103 samples the predetermined number of traffic data from the beginning of the traffic data sorted on a predetermined basis. In this way, the generation apparatus 10 can perform the sampling in a variety of ways depending on characteristics of the data and the like.

Other Embodiments

At least part of the preprocessing, the sampling, and the feature vector generation processing may be performed by parallel processing. The configuration and the processing of the case in which the generation apparatus 10 performs the parallel processing will be described with reference to FIGS. 6 and 7.

Figure 6:
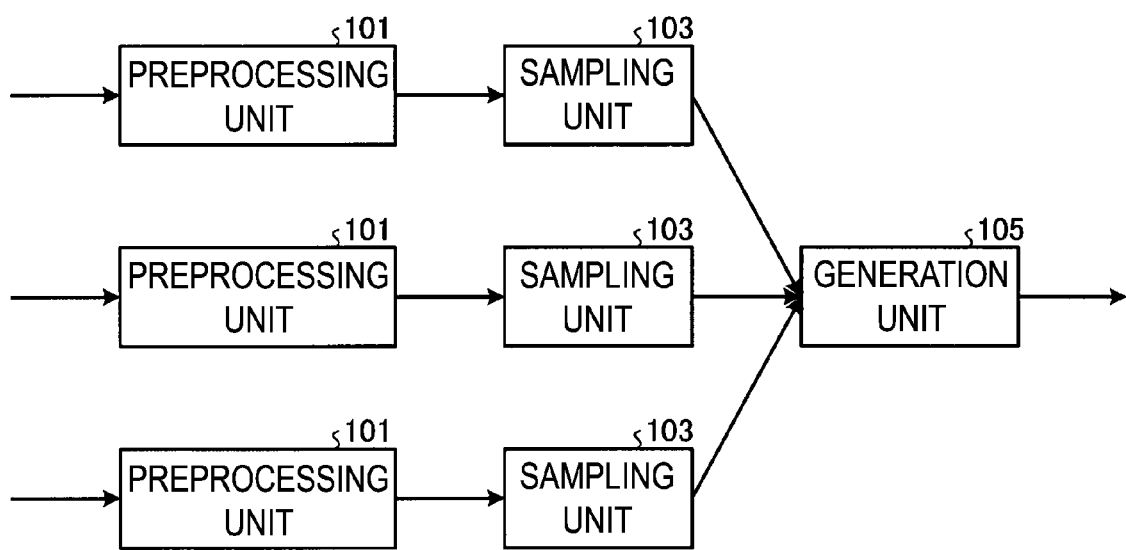
FIG. 6 is a view illustrating a configuration example in which feature amount generation processing is performed in parallel.

FIG. 6 is a view illustrating a configuration example in which the preprocessing is performed in parallel. As illustrated in FIG. 6, the generation apparatus 10 includes a plurality of preprocessing units 101 and a plurality of sampling units 103, and performs the preprocessing and the sampling in parallel. In this case, the preprocessing units 101 may define different thresholds, and the sampling may be performed using the threshold defined by the preprocessing unit 101 to which the sampling unit 103 is connected. This allows the threshold to be flexibly defined depending on the number of traffic data for each target after aggregation.

Figure 7:
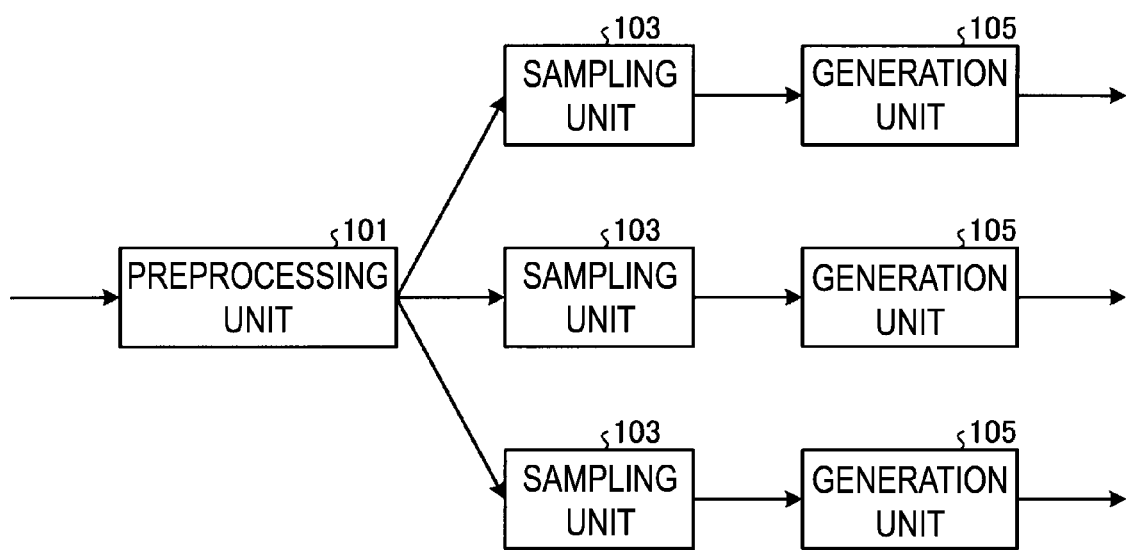
FIG. 7 is a view illustrating a configuration example in which preprocessing is performed in parallel.

FIG. 7 is a view illustrating a configuration example in which the feature amount generation processing is performed in parallel. As illustrated in FIG. 7, the generation apparatus 10 includes a plurality of generation units 105, and can perform the generation processing of the feature vector in parallel. In this case, time required for the feature vector generation can be shortened.

System Configuration and the Like

Further, each illustrated component of each apparatus is functional and conceptual, and does not necessarily need to be physically configured as illustrated in the drawing. That is, a specific form of distribution and integration of the respective apparatuses is not limited to a form illustrated in the drawings, and all or some of the apparatuses can be distributed or integrated functionally or physically in any units according to various loads, and use situations. Further, all or any part of each processing function to be performed in each apparatus can be realized by the CPU and a program being analyzed and executed by the CPU, or can be realized as hardware by wired logic.

In addition, all or some of the processes described as being performed automatically among the processes described in the present embodiment can be performed manually, or all or some of the processes described as being performed manually can be performed automatically by a known method. Furthermore, the processing procedures, the control procedures, the specific names, and the information including various types of data and parameters described in the present specification and the drawings can be optionally changed unless otherwise mentioned.

Program

As one embodiment, the generation apparatus 10 can be mounted by installing a generation program executing the above-described extraction processing in a desired computer as packaged software or online software. For example, an information processing apparatus can function as the generation apparatus 10 by causing the information processing apparatus to execute the above-described generation program. Here, the information processing apparatus includes a desktop or laptop personal computer. In addition, as the information processing apparatus, a mobile communication terminal such as a smart phone, a mobile phone, and a Personal Handyphone System (PHS), or a smart terminal such as Personal Digital Assistant (PDA) are included in the category.

In addition, the generation apparatus 10 can be mounted as an extraction server apparatus providing service regarding the extraction processing to the client with a terminal apparatus used by a user as a client. For example, the extraction server apparatus is mounted as a server apparatus providing extraction service in which traffic data is input while a first feature amount and a second feature amount are output. In this case, the extraction server apparatus may be mounted as a web server or may be mounted as a cloud that provides services regarding the extraction processing by outsourcing.

Figure 8:
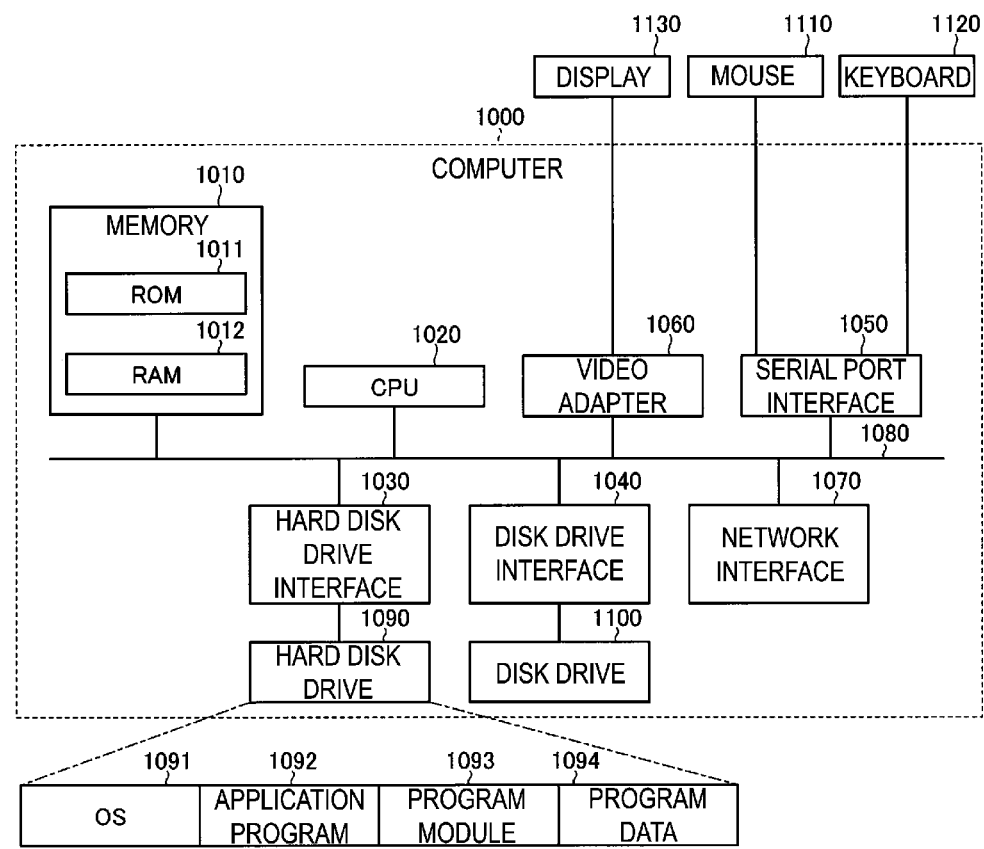
FIG. 8 is a view illustrating an example of a computer that executes a generation program.

FIG. 8 is a view illustrating an example of a computer executing the generation program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as, for example, a basic input output system (BIOS). The hard disk drive interface 1030 is connected to a hard disk drive 1090. The disk drive interface 1040 is connected to a disk drive 1100. A removable storage medium such as, for example, a magnetic disc or an optical disc is inserted into the disk drive 1100. The serial port interface 1050 is connected to, for example, a mouse 1110 and a keyboard 1120. The video adapter 1060 is connected to a display 1130, for example.

The hard disk drive 1090 stores, for example, an OS 1091, an application program 1092, a program module 1093, and program data 1094. That is, a program defining each processing of the generation apparatus 10 is mounted as the program module 1093 in which a computer executable code is described. The program module 1093 is stored in, for example, the hard disk drive 1090. For example, the program module 1093 executing the same processing as that performed by the functional configuration in the generation apparatus 10 is stored in the hard disk drive 1090. The hard disk drive 1090 may be replaced with an SSD.

Further, setting data used in the process of the embodiment described above is stored as the program data 1094 in the memory 1010 or the hard disk drive 1090, for example. The CPU 1020 reads the program module 1093 and the program data 1094 stored in the memory 1010 and the hard disk drive 1090 into the RAM 1012 as necessary, and executes the processing of the above-described embodiments.

The program module 1093 and the program data 1094 are not necessarily stored in the hard disk drive 1090, and may be stored in, for example, a removable storage medium and be read out by the CPU 1020 through the disk drive 1100 or the like. Alternatively, the program module 1093 and the program data 1094 may be stored in another computer connected via a network (a local area network (LAN), a wide area network (WAN), or the like). The program module 1093 and the program data 1094 may be read out by the CPU 1020 from another computer through the network interface 1070.

REFERENCE SIGNS LIST

10 Generation apparatus
20 Data set
30 Prediction result
101 Preprocessing unit
102 Selection unit
103, 104 Sampling unit
105 Generation unit
107 Learning unit
108 Model
109 Prediction unit

The invention claimed is:

1. A generation apparatus comprising:
processing circuitry configured to:
aggregate a plurality of traffic data for every predetermined target;
sample target traffic data in which a number of traffic data aggregated exceeds a threshold; and
generate a first feature vector representing a feature of aggregated traffic data for a target that is not sampled, and generate a second feature vector representing a feature of sampled traffic data for the target sampled, wherein the first feature vector is different from the second feature vector and are used in identifying whether the plurality of traffic data is malignant.

2. The generation apparatus according to claim 1, wherein the processing circuitry is further configured to sample a first number of traffic data, wherein the first number is equal to the threshold, or greater than or equal to the threshold and less than the number of traffic data aggregated to the target.

3. The generation apparatus according to claim 1, wherein the processing circuitry is further configured to sample a predetermined number of traffic data from a starting time of the traffic data sampling and the sampled traffic data is sorted based on a predetermined standard.

4. A generation method comprising:
aggregating a plurality of traffic data for every predetermined target;
sampling target traffic data in which a number of aggregated traffic data at the aggregating exceeds a threshold; and
generating a first feature vector representing a feature of aggregated traffic data for a target that is not sampled at the sampling, and generating a second feature vector representing a feature of sampled traffic data for the target sampled at the sampling, by processing circuitry, wherein the first feature vector is different from the second feature vector and are used in identifying whether the plurality of traffic data is malignant.

5. A non-transitory computer-readable recording medium storing therein a generation program that causes a computer to execute a process comprising:
aggregating a plurality of traffic data for every predetermined target;
sampling target traffic data in which a number of aggregated traffic data at the aggregating exceeds a threshold; and
generating a first feature vector representing a feature of aggregated traffic data for a target that is not sampled at the sampling, and generating a second feature vector representing a feature of sampled traffic data for the target sampled at the sampling, wherein the first feature vector is different from the second feature vector and are used in identifying whether the plurality of traffic data is malignant.

* * * * *